(12) United States Patent
Tan et al.

(10) Patent No.: US 8,030,630 B2
(45) Date of Patent: Oct. 4, 2011

(54) IMAGING READER SYSTEM WITH SAFETY CONTROL

(75) Inventors: Chinh Tan, Setauket, NY (US); Rong Liu, Selden, NY (US); Carl Wittenberg, Water Mill, NY (US); Ming Yu, Hoffman Estates, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 376 days.

(21) Appl. No.: 12/263,644

(22) Filed: Nov. 3, 2008

(65) Prior Publication Data

US 2010/0111361 A1    May 6, 2010

(51) Int. Cl.
*G06K 9/00* (2006.01)

(52) U.S. Cl. ............ 250/555; 250/227.11; 235/41; 382/103

(58) Field of Classification Search ............ 250/555, 250/227.11–227.32; 235/462.41, 462.42; 382/103

See application file for complete search history.

(56) References Cited

U.S. PATENT DOCUMENTS

| 3,676,667 | A * | 7/1972 | Malifaud | 362/301 |
| 6,854,650 | B2 * | 2/2005 | Hattersley et al. | 235/454 |
| 2006/0196944 | A1 * | 9/2006 | Maeda et al. | 235/462.42 |

OTHER PUBLICATIONS

William Cassarly, "Design of Efficient Illumination Systems," SPIE Education Series, Aug. 11, 2008, p. 1-79, United States; (2) pages total.
Warren J. Smith, "Modern Optical Engineering, The Design of Optical Systems," 1990, pp. 264-265, McGraw-Hill, Inc., United States; (3) pages total.
"EX25 Near/Far 2D Imager Engine," Intermec® Product Profile, Jul. 2008, United States; (2) pages total.

* cited by examiner

*Primary Examiner* — Tony Ko
(74) *Attorney, Agent, or Firm* — Nongqiang Fan

(57) ABSTRACT

A method and apparatus comprising an imaging system (10) with safety control for imaging target objects having a scanning arrangement (14) including a sensor assembly (22) for capturing an image from a target object. The sensor assembly (22) has a field-of-view focused by an optical arrangement (24) onto a sensor array (28). The imaging system further comprises an illumination assembly (18) having a housing (30), illumination source (38), light pipe (42), and projection lens (36). The illumination assembly (18) provides light energy toward the sensor assembly field-of-view for illuminating the target object to be imaged on the sensor array (28). The light pipe (42) comprises a multi-walled tapered body (52) having an input face (40). The walls of the body (52) create mirrored images of the illumination source (38), together with the projection lens redistribute the amount of light energy directed at the eyes of a human.

24 Claims, 10 Drawing Sheets

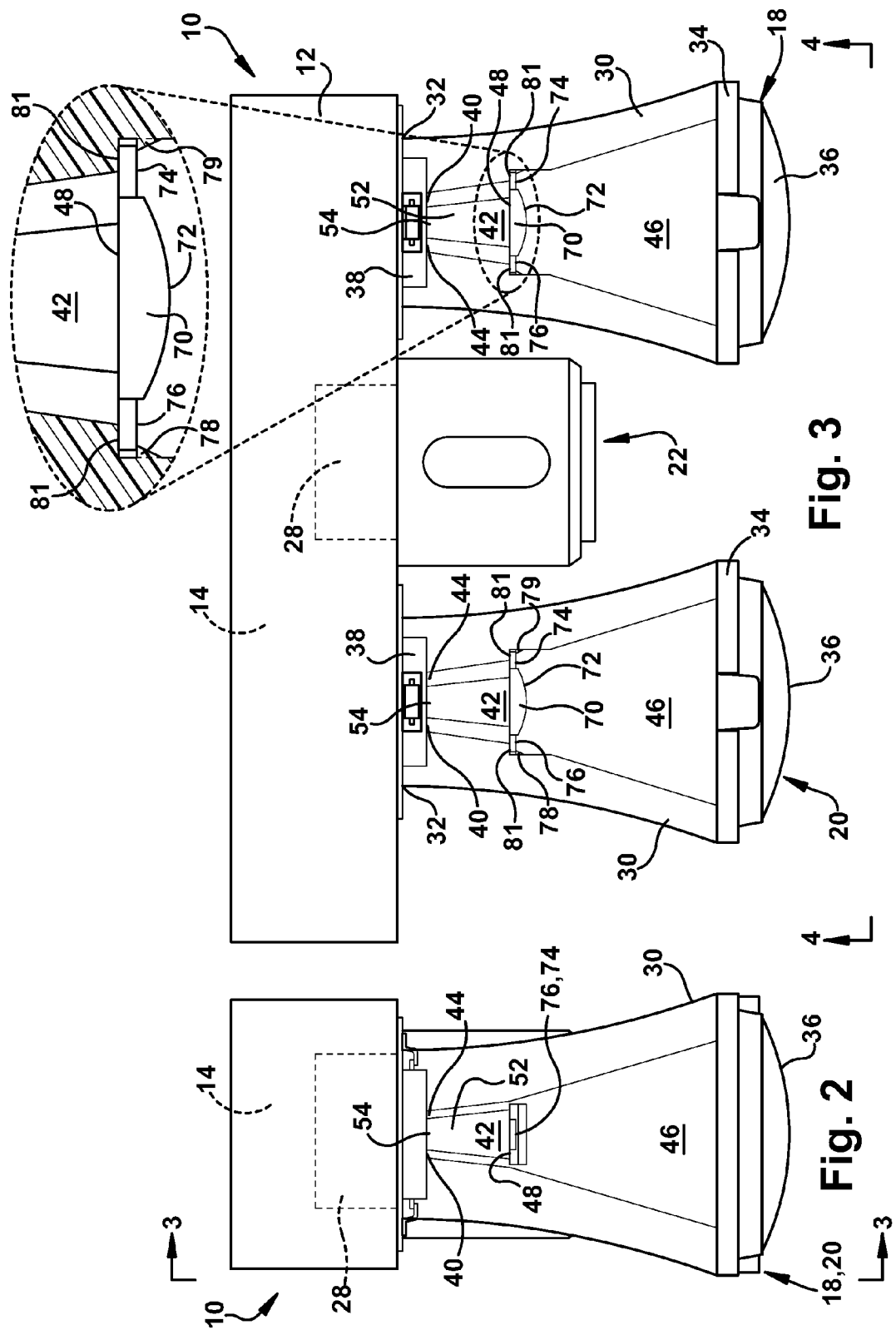

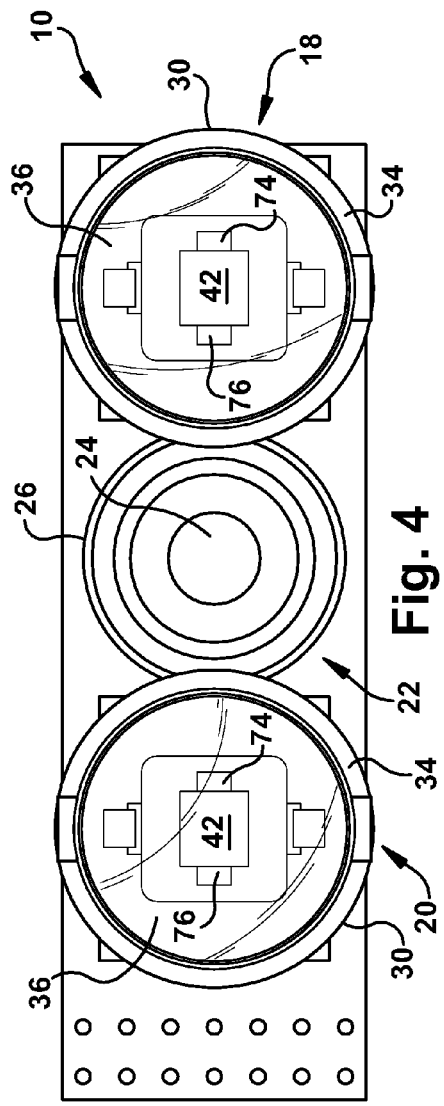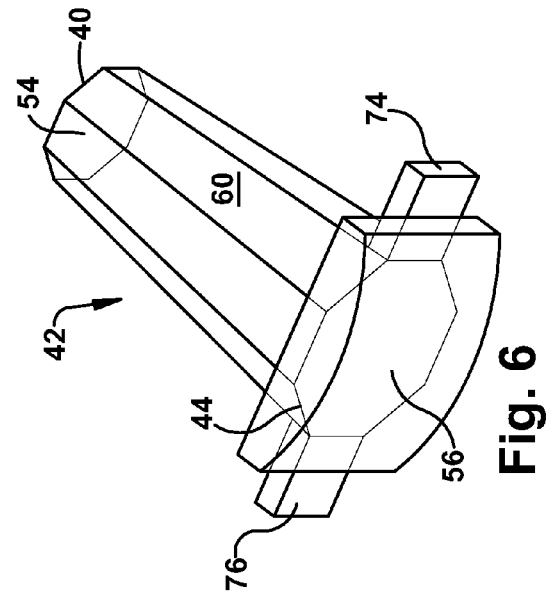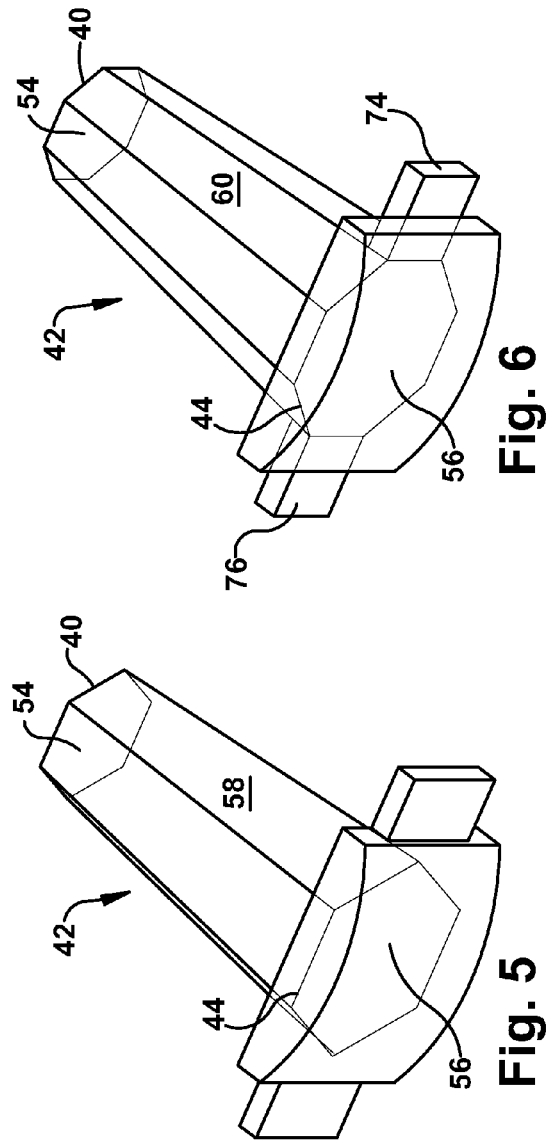

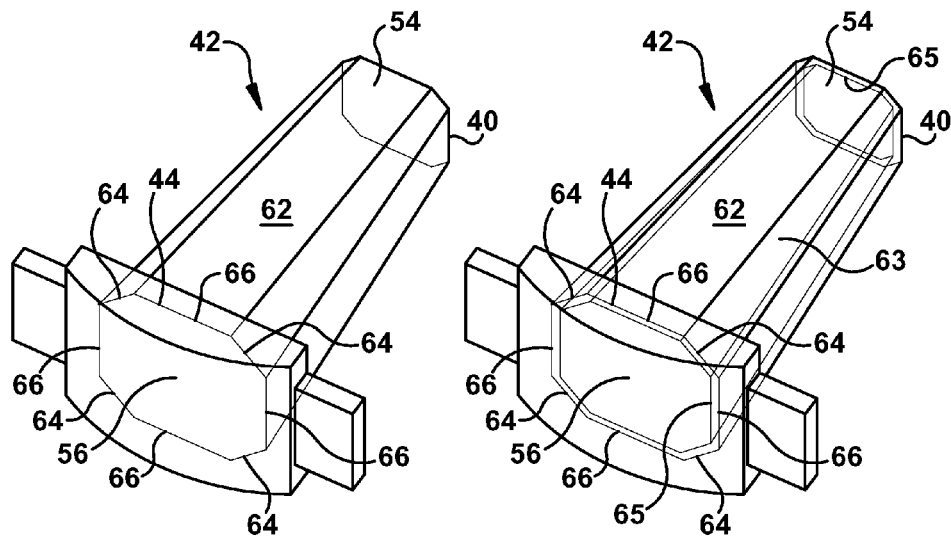
Fig. 7A  Fig. 7B
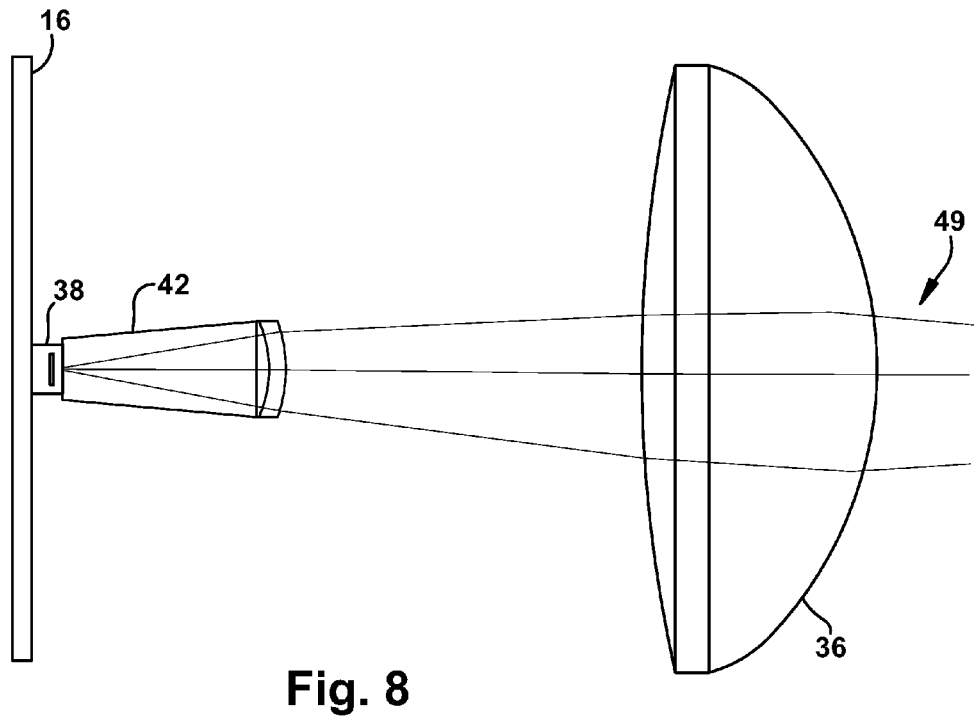
Fig. 8

IMAGING READER SYSTEM WITH SAFETY CONTROL

TECHNICAL FIELD

The present disclosure relates to an imaging reader system having safety control, and more specifically, an imaging reader system having a uniform illumination pattern in a concentrated field-of-view that mitigates solid state lighting radiation hazard to the human eyes.

BACKGROUND

Various electro-optical systems have been developed for reading optical indicia, such as barcodes. A barcode is a coded pattern of graphical indicia comprised of a series of bars and spaces of varying widths, the bars and spaces having differing light reflecting characteristics. The pattern of the bars and spaces encode information. Barcodes may be one dimensional (e.g., UPC barcode) or two dimensional (e.g., DataMatrix barcode). Systems that read, that is, image and decode barcodes employing imaging camera systems are typically referred to as imaging-based readers or scanners.

Imaging-based readers may be portable or stationary. A portable reader is one that is adapted to be held in a user's hand and moved with respect to target indicia, such as a target barcode to be read, that is, imaged and decoded. Stationary readers are mounted in a fixed position, for example, relative to a point-of-sales counter. Target objects, e.g., a product package that includes a target barcode are presented or swiped past one or more transparent windows and thereby pass within a field-of-view of the stationary readers.

The imaging based readers typically comprise a sensor or photodetector that collects light reflected from the target indicia located on an article or target object. The sensor or photodetector typically comprise charge coupled device (CCD) arrays, complementary metal oxide semiconductor (CMOS) arrays, or other imaging pixel arrays having a plurality of photosensitive elements or pixels.

A corresponding analog signal is generated by the sensors that are decoded into a digital signal representative of the target indicia being read. In general, the photosensors discussed above in areas of inadequate ambient lighting require a source of illumination that is scattered across the target indicia within or over the photosensor's field-of-view in order to produce the analog signal. A typical illumination system comprises light emitting diodes (LEDs), cold cathode florescent lamps (CCFLs), and the like that act as an illumination source for the imaging reader.

SUMMARY

One example embodiment of the present disclosure includes an imaging system with safety control for imaging target objects comprising a scanning arrangement having a sensor assembly for capturing an image from a target object. The sensor assembly has a field-of-view focused by an optical arrangement onto a sensor array located within the sensor assembly. The imaging system further comprises an illumination assembly having a housing, illumination source, light pipe, and projection lens. The illumination assembly provides light energy toward the sensor assembly field-of-view for illuminating the target object to be imaged on the sensor array. The light pipe comprises a multi-walled tapered body having an input face at a first end of the body. The input face is juxtaposed with the illumination source and an output face having the same geometrical configuration as the input face is located at a second end of the body opposite the first end. The input face is smaller in size than the output face. The walls of the body create mirrored images of the illumination source redistributing the amount of light energy directed at human eyes.

Another example embodiment of the present disclosure includes a method of imaging a target object with an imaging system having safety control, comprising a process of providing a substantially uniform distribution of light energy in a concentrated area in or over a field-of-view of a sensor array of a scanning arrangement by adapting an input face of a tapered-shaped light pipe to an illumination source and projecting the light energy through a projection lens. The method further comprises the process of generating mirrored images of the illumination source with side walls forming the light pipe, thereby redistributing the amount of the light energy directed at a lens simulating the eye lens of the human eye such that light energy projected through the simulated eye lens is diffused into a plurality of locations on the simulated eye and such that the individual and aggregated energy intercepted by the simulated eye is below an accessible energy level.

A further example embodiment of the present disclosure includes a method of imaging a target object with an imaging system having safety control, comprising a process of providing a substantially uniform distribution of light energy in a concentrated area in or over a field-of-view of a sensing means coupled to a scanning arrangement by adapting a light transferring means to an illumination means and projecting the light energy through optical means. The method further comprises the process of generating mirrored images of the illumination means with side walls forming the light transferring means, thereby redistributing the amount of the light energy directed at a lens simulating the human eye such that light energy projected through the lens is diffused into a plurality of sectors. The method also comprises the process of reducing the amount of the uniform light energy directed at the lens simulating the human eye such that the light energy projected through the lens is diffused into an area greater than the concentrated area.

A yet further example embodiment of the present disclosure includes a scanning arrangement with safety control for imaging and decoding target objects comprising a sensor assembly for capturing an image from a target object. The sensor assembly comprises a field-of-view focused by an optical arrangement onto a sensor array located within the sensor assembly. The scanning arrangement further comprises an illumination assembly having a housing, illumination source, light pipe, and projection lens. The illumination assembly provides light energy toward the sensor assembly field-of-view for illuminating the target object to be imaged on the sensor array. The light pipe comprises a multi-walled tapered body between a first end and a second end opposite the first end. The first end has an input face in contact with the illumination source and an output face having the same geometrical configuration as the input face. The input face is smaller in size than the output face. The scanning arrangement also comprises a field lens integrally connected on the second end of the output face of the light pipe. The walls of the tapered body create mirrored images of the illumination source and the field lens increasing the light energy into an area greater than the concentrated area such that collectively, the projection lens, field lens and light pipe reduce and redistribute the amount of light energy directed at the eyes of the user.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 2 is a side view of the imaging reader of FIG. 1;

FIG. 3 is a plan view of the imaging reader of FIG. 1;

FIG. 4 is an elevation view of the imaging reader of FIG. 1;

FIG. 5 is a light pipe constructed in accordance with another example embodiment of the present disclosure;

FIG. 6 is a light pipe constructed in accordance with another example embodiment of the present disclosure;

FIG. 7A is a light pipe constructed in accordance with yet another example embodiment of the present disclosure;

FIG. 7B is a light pipe constructed in accordance with also another example embodiment of the present disclosure;

FIG. 8 illustrates ray tracings projected from the imaging reader system of FIG. 1;

DETAILED DESCRIPTION

The present disclosure relates to an imaging reader system having safety control, and more specifically, an imaging reader system having a uniform illumination pattern in a concentrated field-of-view that mitigates solid state lighting radiation hazard to the human eyes of the user or bystanders while the imaging reader system is operating. Imaging systems for reading target indicia and in particular miniature imaging readers typically require an extended range for imaging. The imaging systems typically comprise a scanning arrangement or scan engine, imaging optics, a photosensor or sensor array, and artificial light or an illumination source such as a light emitting diode (LED) or bank of LEDs, and cold cathode fluorescent lamps (CCFLs). The scanning arrangement's photosensor(s) and associated optics typically have a narrow field-of-view (FOV) of less than twenty degrees.

Because of the increased range performance requirements of imaging systems, high powered illumination sources and LEDs are being used. As a result, eye safety of the user becomes a concern. The imaging reader system of the present disclosure eliminates this concern by providing a substantially uniform and concentrated illumination pattern in a FOV of a sensor or sensor arrays, and by increasing the apparent size of the illumination source that minimizes the harmful effects on the user and bystanders. By providing uniform illumination across the sensor's FOV, the images obtained by the sensors are improved, generating enhanced signal performance.

Figure 1:
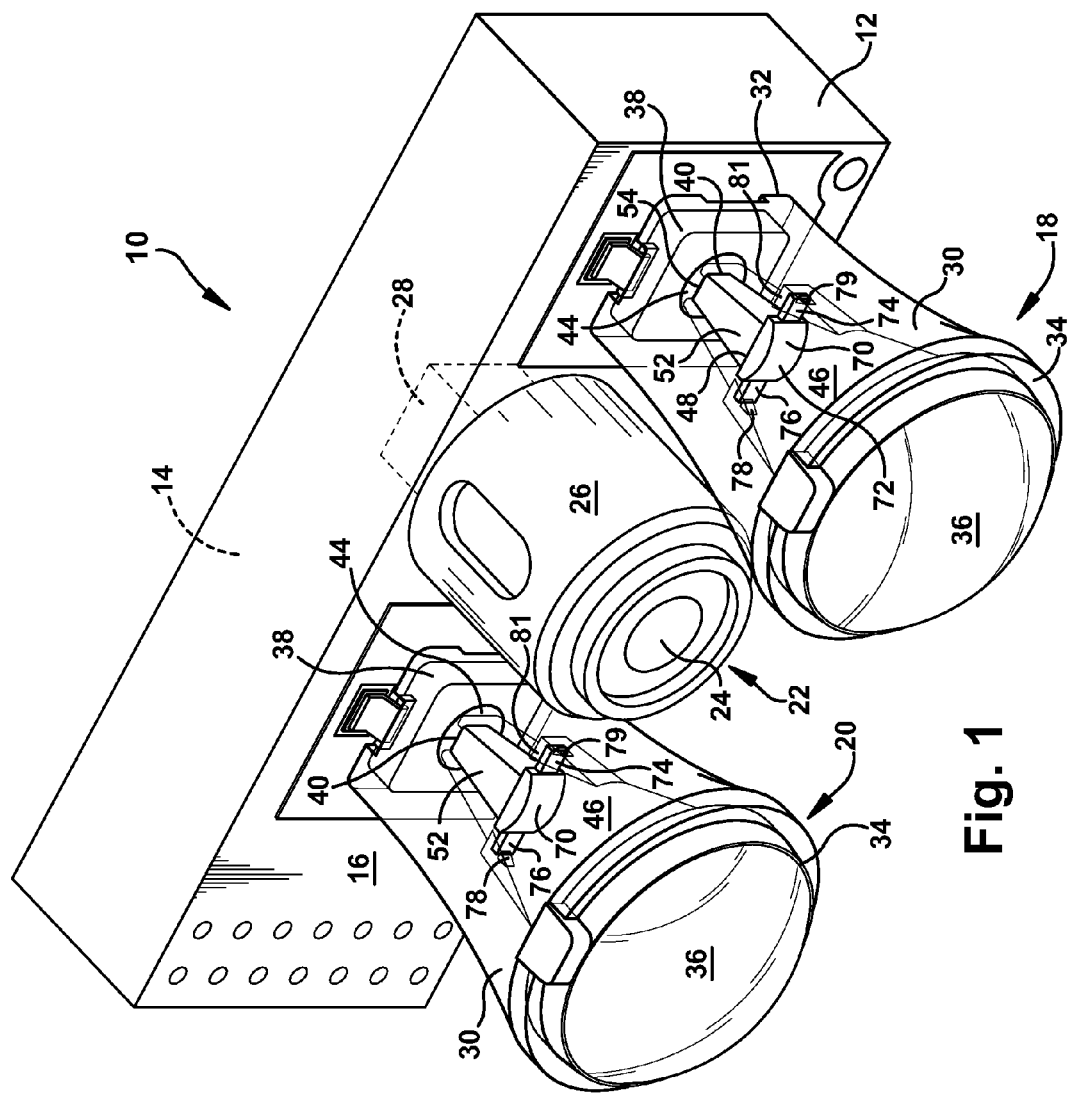
FIG. 1 is a perspective view of a imaging reader system constructed in accordance with one example embodiment of the present disclosure.

Referring now to the figures and in particular to FIG. 1 is an imaging reader system 10 constructed in accordance to one example embodiment of the present disclosure. The imaging reader system 10 is capable imaging and decoding target indicia, such as barcodes and is also capable of capturing images such as an image or a document that contains signatures, graphics or the like. The imaging reader system 10 includes a chassis 12 supporting a scanning arrangement or scan engine 14 and decoding system (not shown) that are further discussed and its operation explained in U.S. patent application Ser. No. 11/807,746, filed May 30, 2007 and entitled SCAN ENGINE INTERFACE that is assigned to the assignee of the present disclosure and incorporated herein by reference in its entirety.

Figure 9:
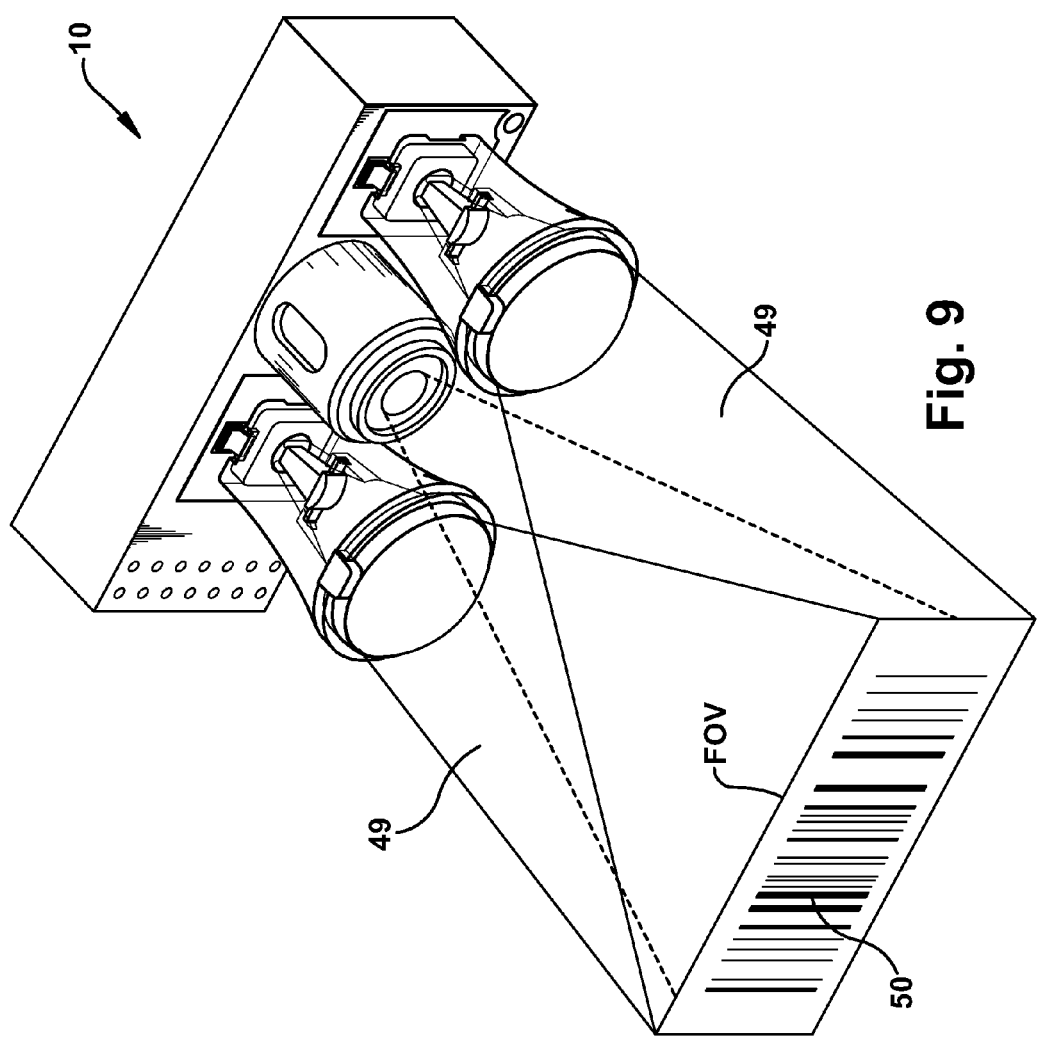
FIG. 9 illustrates the projection of an illumination field from an illumination assembly onto a sensor field-of-view as constructed in accordance with one example embodiment of the present disclosure.

A printed circuit board 16 is attached to the chassis 12 and provides communication links between various electrical components of the scanning arrangement 14. First and second illumination assemblies 18, 20, respectively are coupled to the printed circuit board 16 and axially located about a sensor assembly 22. The sensor assembly 22 comprises focusing optics 24 that can be a single lens or combination of lenses that focus a FOV (see FIG. 9) onto a sensor or sensor array 28, such as a CMOS or CCD type sensor array located within the scanning arrangement 14. The focusing optics 24 are housed in a lens support 26.

In one example embodiment of the present disclosure, the imaging reader system 10 is adapted to a portable handheld scanner that can be carried and used by a user walking or riding through a store, warehouse or plant, while scanning barcodes for stocking and inventory control purposes. In another example embodiment, the imaging reader system 10 is adapted to a stationary or presentation type scanner. Such examples of a presentation type scanner includes scanners located in a store check-out aisle where the operators swipe or present a target object or article having a barcode to be imaged and decoded for pricing. However, it should be recognized that the imaging reader system 10 of the present disclosure, may be advantageously used in connection with any type of imaging-based automatic identification system including, but not limited to, barcode readers, signature imaging acquisition and identification systems, optical character recognition systems, fingerprint identification systems and the like. It is the intent of the present disclosure to encompass all such imaging-based automatic identification systems.

Returning again to FIG. 1 along with FIGS. 2-4 illustrate various views of the imaging reader system 10 constructed in accordance with one example embodiment of the present disclosure. The imaging reader system 10 of the present disclosure illustrates two illumination assemblies 18 and 20, however could include only one or a plurality of illumination assemblies without departing from the spirit and scope of the claimed disclosure. The design of the illumination assemblies 18 and 20 allow for the projection of light patterns 49 to the target indicia 50 (see FIG. 9) within or over a FOV of the sensor or sensor array 28. The illumination assemblies 18 and 20 comprise a housing 30 having a first end 32 coupled to the printed circuit board 16 and a second end 34 opposite the first end and supporting a projection lens 36. In the illustrated example embodiment, the projection lenses 36 are convex lenses having an effective focal length (EFL) suited for the particular scanning application as understood by one skilled in the art. Further, another example embodiment the projection lens 36 could be a combination of lenses having differing shapes and focal lengths suitable for the sensor FOV for the particular application of the imaging reader system 10.

The first end 32 is adapted to surround an illumination source 38 and allow an input face 40 of a light pipe 42 to be in contact with an outer face 44 of the illumination source. The light pipe 42 is made from transparent glass or plastic and positioned within a hollow cavity 46 of the housing 30. The input face 40 of the light pipe 42 is configured such that it matches the size and configuration of the illumination source 38 and is in contact with the illumination source in order to maximize the illumination efficiency.

The light pipe 42 in the illustrated example embodiment of FIGS. 1-4 is a solid transparent structure where its input face 40 contacts the outer face 44 of the illumination source 38. Additionally in the example embodiment of FIGS. 1-4, the light pipe 42 comprises a four sided rectangular body 52, tapering outward from a smaller surface 54 forming the input face 40 to a relatively larger surface 56 forming an output face 48 of the light pipe.

The rectangular shaped tapered body 52 of the light pipe 42 is designed such to allow the illumination pattern 49 projected from the illumination assemblies 18, 20 to match the particular FOV of the imaging sensor 28, and in the illustrated embodiment of FIGS. 1-4, and 9, the FOV of the sensor accordingly is rectangular. The body 52 of the light pipe 42 could equally be shaped as round or square to match a round or square sensor FOV. The tapered configuration from the input face 40 to the output face 48 terminates it a length suited for a particular application in which the size of the illumination pattern 49 fits within or over the sensor FOV typically directed at the target indicia 50.

In the illustrated embodiment, the shape of the input face 40 of light pipe 42 is in contact and corresponds to the shape of the output face 44 of the illumination source 38. As best seen in FIGS. 1 and 4, since the input face 40 is squarely shaped and the output face 48 is rectangular shaped, only opposite side walls of the body 52 are equal in size. Illustrated in FIG. 5 is another example embodiment of the present disclosure depicting a light pipe 42 having a six sided or walled tapered body 58 with the smaller surface 54 at the input face 40 extending to the output face 44 to the larger surface 56. Illustrated in FIG. 6 is yet another example embodiment of the present disclosure depicting a light pipe 42 having an eight sided or walled tapered body 60 with the smaller surface 54 at the input face 40 extending to the output face 44 to the larger surface 56. Illustrated in FIG. 7A is an additional example embodiment of the present disclosure depicting a light pipe 42 having an eight sided walled or tapered body 62 having differing sized sides represented by smaller facets 64 and larger facets 66. The tapered shape of the body 62 starts with the smaller surface 54 at the input face 40 and extends to the output face 44 to the larger surface 56. The light pipe 42 breaks up the illumination energy imaged to the retina, regardless of whether the body is a four, six, or eight sided. FIG. 7B illustrates yet another example embodiment of the present disclosure depicting a light pipe 42 having a tapered shaped body 62 where the body instead of being solid, comprises a hollow inner core 65 wherein the inner walls 63 are mirrored surfaces.

The light pipe 42 homogenizes the energy from the light source 38, reducing any "hot spot" (an excessive amount of energy) in the illumination field 49. In addition, the light pipe 42 and the side walls of the body create mirror images of the illumination source 38, assisting in the reduction and redistribution of hot spots in the illumination field 49 projected at the human eye while maintaining a uniform distribution of illumination directed at the FOV of the target object. Stated another way, the construct of the imaging reader system 10 maintains a high concentrated illumination pattern when directed at the target indicia such as a barcode within or over the FOV of a sensor array 28, but when the same illumination energy passes through the lens of a human eye, the system redistributes the total energy into reduced energy level sectors, safe for the eye of operators and bystanders as discussed below in further detail in combination with FIGS. 10-16.

Figure 10:
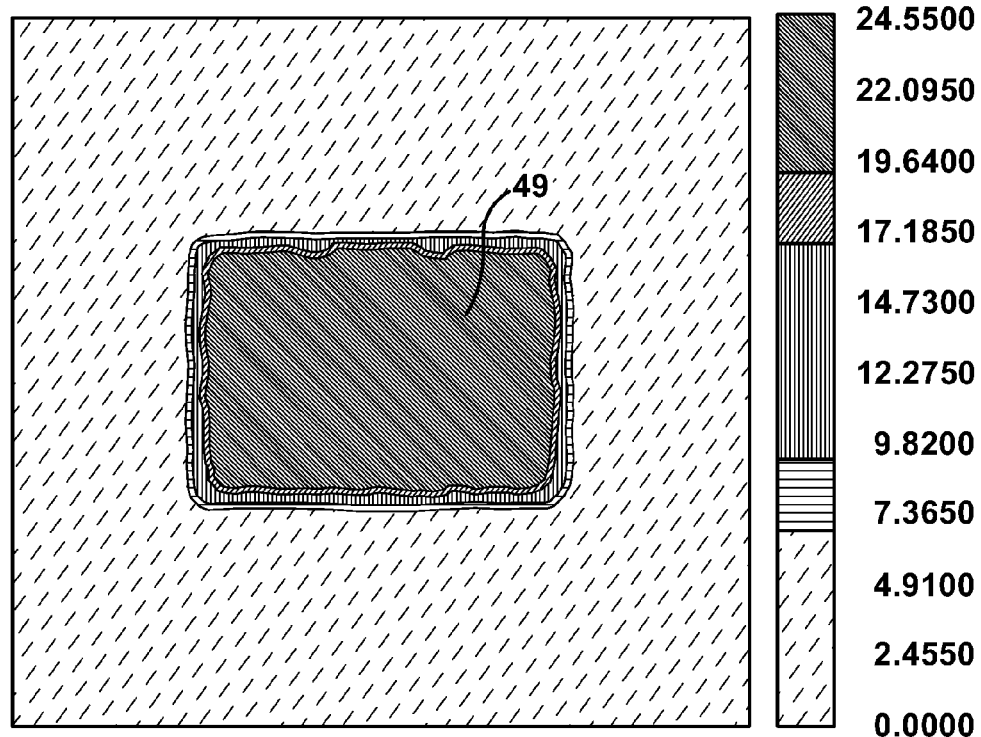
FIG. 10 is an energy distribution from an illumination assembly of the example embodiment of FIG. 1.

This uniform distribution of illumination 49 from the illumination assemblies 18, 20 is graphically shown in FIG. 10. The uniform distribution 49 is additionally achieved through a field lens 70 located at the end of the light pipe 42. The field lens 70 in the illustrated embodiment is a convex lens integrally formed with the light pipe 42, but could also be a separate or independent component from the light pipe without departing from the spirit and scope of the claimed invention. The curved or convex face 72 of the field lens 70 additionally provides optical power needed by the projection lens 36 and to image these virtual LED sources to a closer distance than the start of the reading range of the imaging reader system 10 and the target indicia 50.

In the illustrated embodiment, the light pipe 42 and field lens 70 are integrally formed through a molded or injection process from transparent plastic. Extending from the sides of the field lens 70 are first and second tabs 74, 76, respectively. In yet another example embodiment illustrated in FIG. 6, the tabs 74, 76 extend from the body 60 of the light pipe 42. During the assembly process and prior to the installation of the projection lenses 36, the light pipes 42 are inserted into the housing 30 into the hollow cavity 46 until the tabs 74, 76 engage a respective catch 78, 79 that is ramp-shaped, allowing the tabs to pass beyond the catches into a locked position, engaging a stop 81 formed by a flat surface of the housing cavity. During the manufacturing process, one of the tabs 74 or 76 is a remnant of the gate where the plastic flows during the molding operation. Typically on molded parts, the remnant is removed after molding to reduce the protrusion. However, the remnant acting as a tab 74 or 76 is not removed so that in conjunction with the other of the tabs formed by the profile of the mold serve as a mechanical mounting feature within the housing 30.

In another example embodiment (not shown), the catches 78 and 79 are absent and the light pipes 42 are secured to the hollow cavity 46 by applying glue to the tabs 74, 76 and housing stop 81 during installation. Since the input face 40 of the light pipes 42 are designed to be in contact with the output face 44 of the illumination source 38 in all example embodiments, variations in tolerances between the tabs 74, 76 and input face 40 of the light pipes 42 may create voids between the output face and input face. The creation of the voids can be overcome by employing an interface in contact between the light pipes' input face 40 and output face 44 of the illumination source 38 having an light index-matching material of the light pipes to further improve the coupling efficiency.

According to laser safety standard IEC60825 in which LED usage must also comply, the energy intercepted by the eye lens and imaged to an area of the retina must be less than a so-called accessible energy level (AEL) set by the IEC60825 standard to avoid heat damage to the retina cells.

The energy exposure to the eye is measured using a 7-mm diameter aperture which simulates a dilated pupil, positioned at a prescribed distance to simulate situations where the eye of a young person can accommodate (typically 100 mm) and where a person looks at the light source through a magnifying glass. The AEL had been established by clinical tests and depending on the AEL level met, a product is classified to class I, II, III or IV. When the dimension of the light source is large, i.e., an extended source, the eye can only intercept a portion of the energy emitted from the source, and the energy is distributed over a larger area of the retina. In this case, the AEL for each class of product is proportionally increased by a certain factor known as C6 coefficient in the above IEC standard. Hence, if the optics can increase the apparent size of the LED, while still be able to concentrate the energy within the FOV, a bright yet eye-safe illumination system is realized. The construct of the illumination assemblies 18 and 20 are designed such that the optics through the light pipe 42, field lens 70, and projection lens 36 and their respective configuration increase the apparent size of the illumination source 38 while still concentrating the energy of the illumination field 49 within the FOV of the sensor 38 and a bright yet eye-safe illumination system is realized. In addition, the construct of the illumination assemblies 18 and 20 described above provide uniform distribution over the illumination field 49 and across the FOV of the sensor 38, increasing the quality of the imaged target indicia 50 to be decoded.

Figure 11:
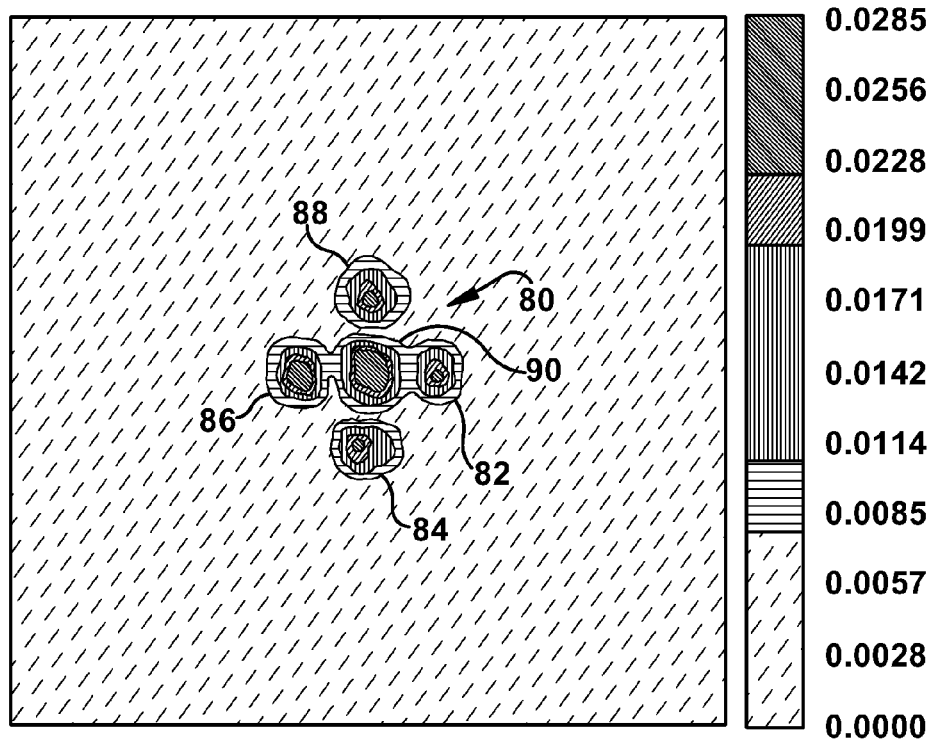
FIG. 11 is an energy distribution simulation from an illumination assembly of the example embodiment of FIG. 1 through an eye lens.

FIG. 10 illustrates the uniform distribution and concentration of the illumination field 49 in angular space that is projected upon the FOV of the sensor array 28. The illumination field in the illustrated embodiment is rectangular shaped having a peak intensity identified by the scale in FIG. 10 of 24.550 watts/steradian. Using the same illumination field 49 and applying it to the above test (according to the IEC 60825 standard) a 1×1 mm LED chip appears (represented by the illumination field 49 in FIG. 10) to become a 10×9 mm spot 80 consisting of five smaller spots or sectors 82, 84, 86, 88, and 90 as shown in FIG. 11. Stated another way, the illumination field 49 from the illumination assemblies 18 and 20 is applied to the IEC 60825 standard test, the energy pattern projected upon a target (retina) through a simulated eye lens results in relatively diffuse and much larger illumination pattern comprising the five energy sectors 82-90 illustrated in FIG. 11.

Figure 12:
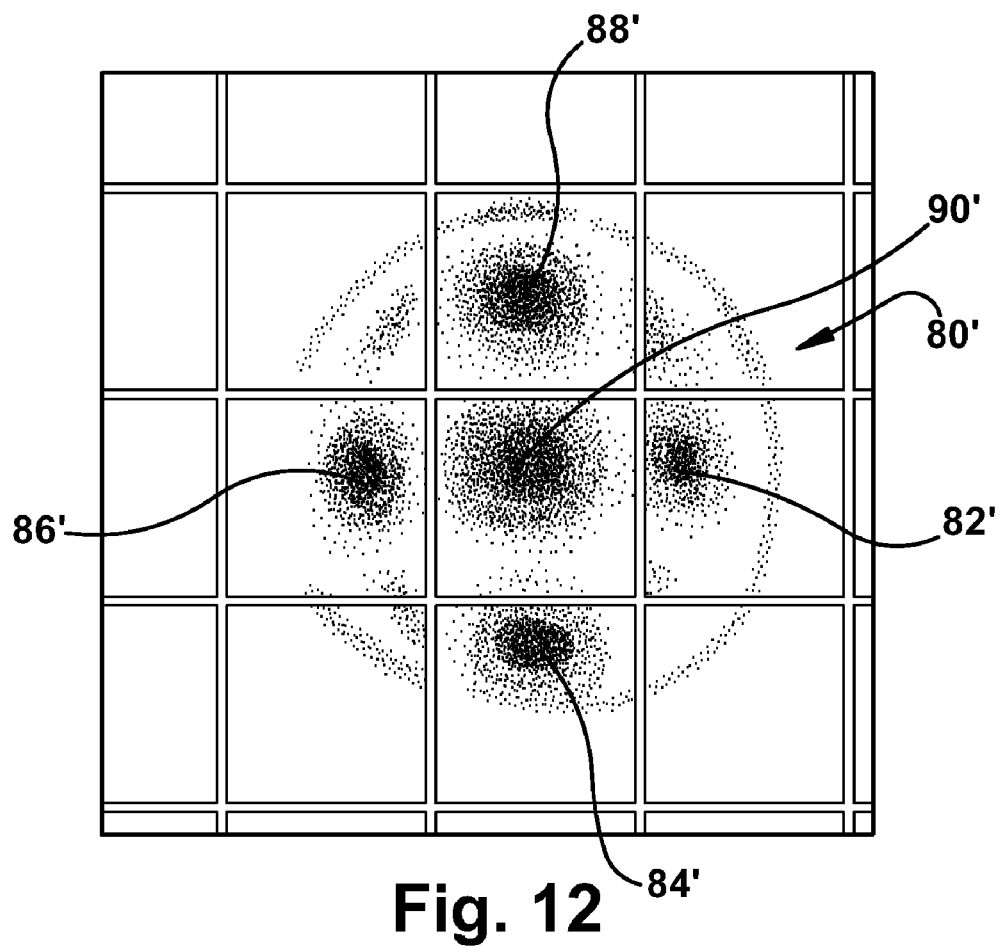
FIG. 12 is an energy distribution experiment image cropped and magnified resulting from an illumination assembly of an example embodiment of the imaging reader system constructed in accordance with the present disclosure.

FIG. 11 illustrates that the illumination sources 18 and 20 not only distribute the light energy of FIG. 10 over a larger area, but breaks down the light energy into the five sectors 82-90 of reduced energy that would heat up the retina cell. As illustrated by the simulation from the illumination field of FIG. 10 projected onto the retina through an eye lens as shown in FIG. 11, the highest or peak irradiance measured is 0.0285 watts/cm$^2$. The four sectors, namely 82, 84, 86, and 88 about the central sector 90 are reflections of the illumination source 38 (LED) through the walls of the light pipe 42, while FIG. 8 generally illustrates the outermost ray tracings projected from the imaging reader system 10 of FIG. 1. FIG. 12 illustrates the results of an energy distribution experiment of the simulation of FIG. 11. The experiment illustrated in the image of FIG. 12 has been cropped and zoomed-in to show the details and similar results in the light pattern projected through the eye lens as shown in the simulation of FIG. 11. The experimental results clearly illustrate the energy spot 80' broken down into the five sectors 82'-90' of reduced energy that would heat up the retina cell. In particular, the energy dissipation of the illumination pattern 100 in one test resulted in 32% of the energy located in the central sector 90', 23% of the energy located in each of the two (2) vertical sectors, 84' and 88', and 11% of the energy located in each of the two (2) horizontal sectors 82' and 86'.

Figure 13:
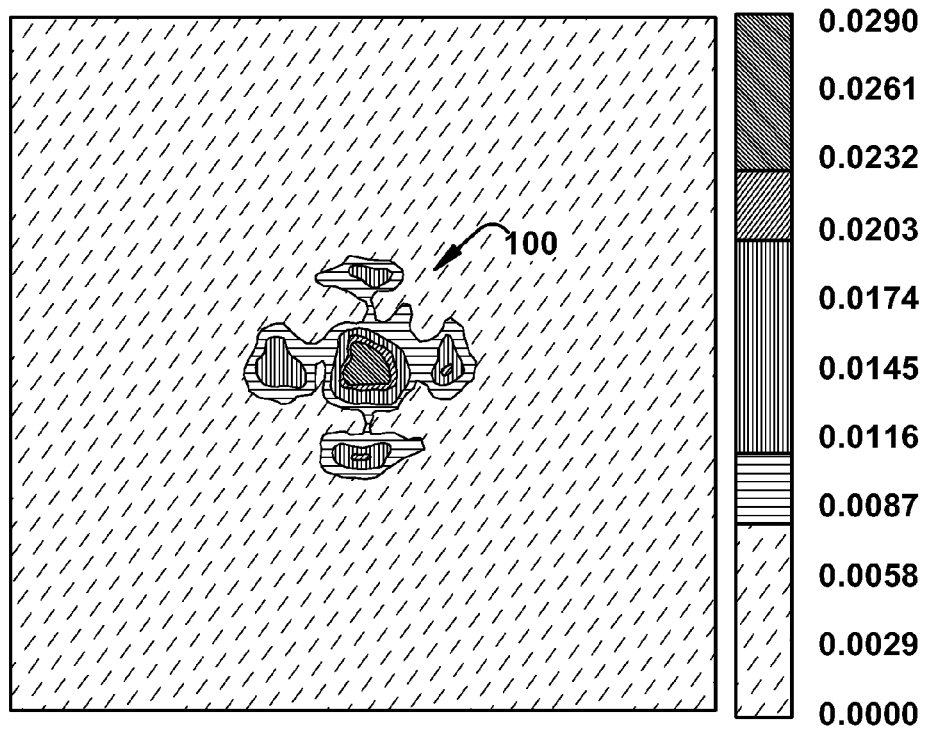
FIG. 13 is a variation of an energy distribution from an illumination assembly without a field lens projected through an eye lens.
Figure 14:
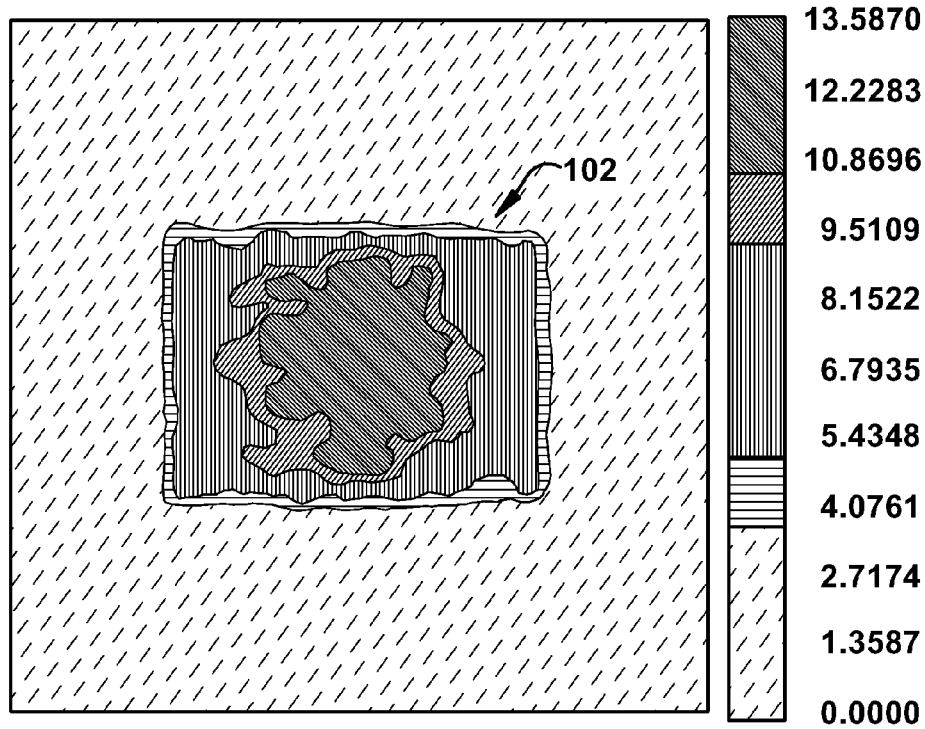
FIG. 14 is a variation of an energy distribution from an illumination assembly without a field lens illustrating non-uniform illumination distribution in angular space on a target.

FIG. 13 is a variation of an energy distribution from an illumination assembly 18, 20, lacking a field lens 70 on the tapered light pipe 42 as the illumination energy 100 is projected through an eye lens in accordance with the standards of IEC60825. FIG. 13 illustrates that the illumination pattern 100 is still enlarged, but lacks the uniformity of the embodiment of FIG. 11 simulated with a field lens. FIG. 14 is a variation of an energy distribution from the illumination assembly 18, 20, again lacking the field lens, illustrating a non-uniform illumination distribution 102 in angular space on a target when compared with the embodiment simulated with a field lens 70 shown in FIG. 10.

Figure 15:
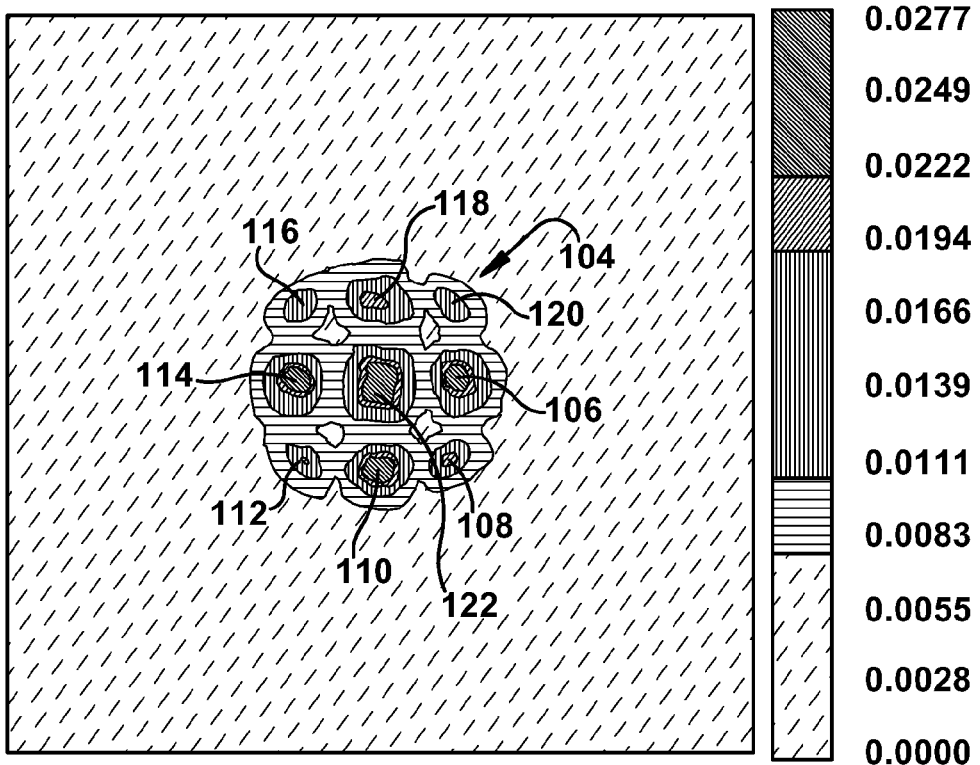
FIG. 15 is a variation of an energy distribution from an illumination assembly with a straight light pipe with square input and output faces used projected though an eye lens.
Figure 16:
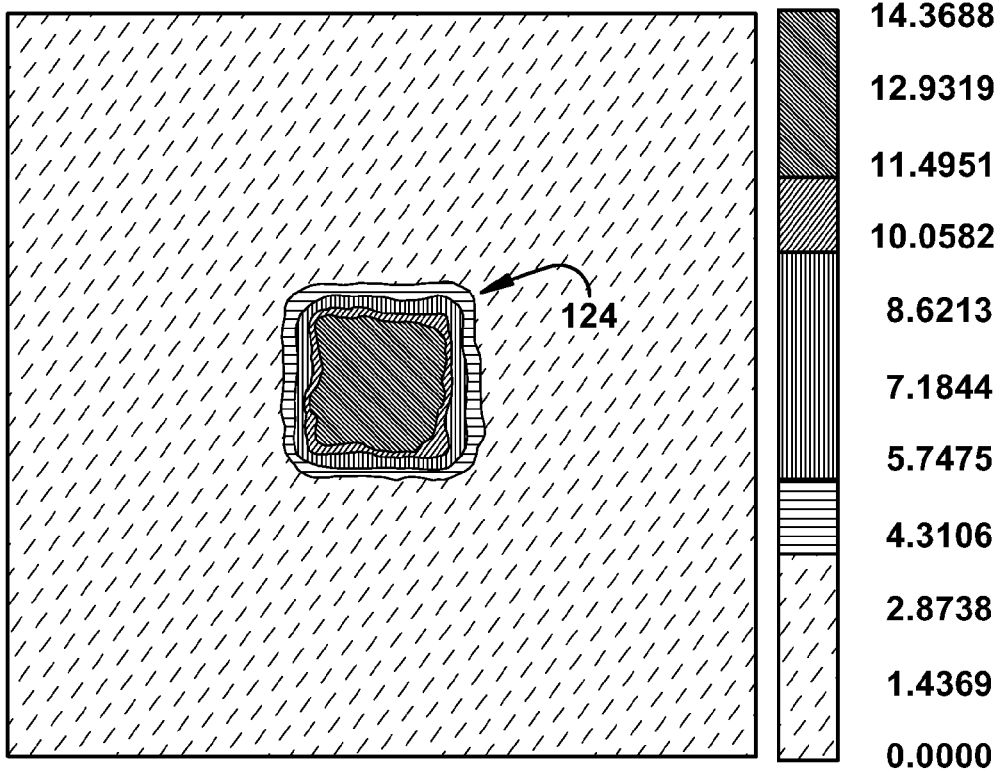
FIG. 16 is a variation of an energy distribution from an illumination assembly having a straight light pipe, illustrating non-uniform illumination distribution in angular space on a target.

FIG. 15 is another variation of an energy distribution from an illumination assembly 18, 20, lacking a tapered body on a light pipe 42, but instead comprises a straight square-shaped light pipe where the input face 40 and output face 48 are of the same size and square configuration. The illumination energy 104 in FIG. 15 is shown projected through an eye lens in accordance with the standards of IEC60825 and illustrates a pattern that has increased in apparent size relative to FIG. 11 and divided into nine (9) quasi sectors 106-122. FIG. 16 illustrates variation of the illumination assembly 18, 20, of FIG. 15, lacking a tapered body on a light pipe 42, but instead comprises a straight square-shaped light pipe where the input face 40 and output face 48 are of the same size and square configuration. It can be seen in FIG. 16 when compared with FIG. 11 the illumination energy 124 in FIG. 16 is square and concentrated a smaller angular space, but the apparent size of the source is larger. (FIG. 11 is approximately 9×10 mm vs. FIG. 16 which is approximately 13×13 mm) This indicates that optics is efficient where the etendue is conserved (that is the solid angle*area=a constant).

Figure 17:
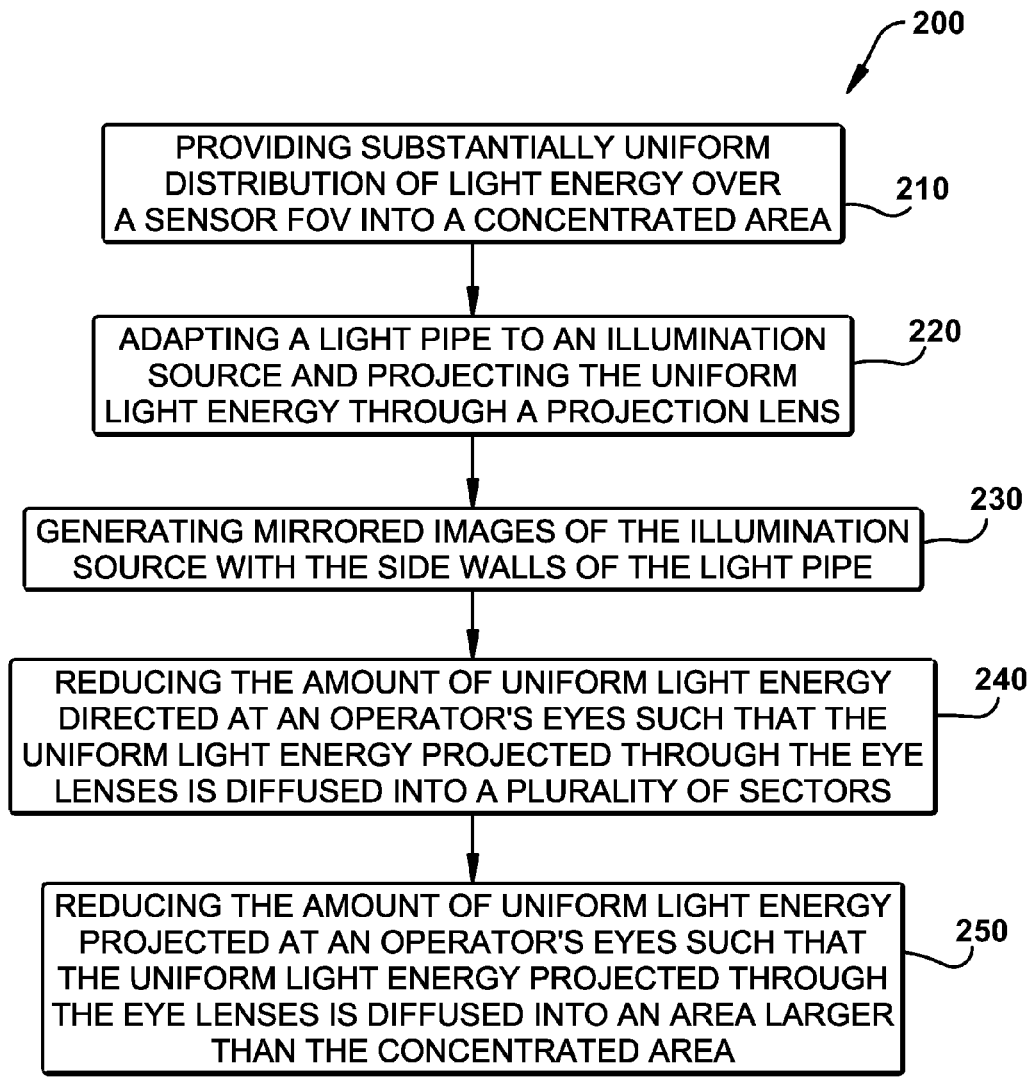
FIG. 17 is a flowchart of an exemplary embodiment of the present disclosure.

FIG. 17 is a flowchart of an exemplary embodiment of the present disclosure depicting a process 200 for an imaging reader system 10 having a uniform illumination pattern in a concentrated field-of-view that mitigates harmful effects to the user. At 210, the process 200 comprises providing a substantially uniform distribution of light energy over a sensor field-of-view into a concentrated area. At 220, the process 200 comprises adapting a light pipe to an illumination source and projecting the uniform light energy through a projection lens. At 230, the process 200 comprises generating mirrored images of the illumination source with the side walls of the light pipe. At 240, the process 200 comprises reducing the amount of uniform light energy directed at an operator's eyes such that the uniform light energy projected through the eye lenses is diffused into a plurality of sectors. At 250, the process 200 comprises reducing the amount of uniform light energy projected at an operator's eyes such that the uniform light energy projected through the eye lenses is diffused into an area larger than the concentrated area.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An imaging system with safety control for imaging target objects comprising:

a scanning arrangement comprising a sensor assembly for capturing an image from a target object, the sensor assembly having a field-of-view focused by an optical arrangement onto a sensor array located within the sensor assembly; and an illumination assembly comprising a housing, illumination source, light pipe, and projection lens, the illumination assembly providing light energy toward the sensor assembly field-of-view for illuminating the target object to be imaged on the sensor array;

the light pipe comprising a multi-walled tapered body having an input face at a first end of said body, the input face being juxtaposed with the illumination source and an output face at a second end of said body opposite said first end, the input face being smaller in size than said output face, the walls of said body creating mirrored images of the illumination source that redistribute the amount of light energy directed at any particular area of the human eyes.

2. The imaging system with safety control of claim 1, wherein said housing subtends said illumination source comprising a light-emitting-diode.

3. The imaging system with safety control of claim 1, wherein a field lens and light pipe are integrally formed from one of transparent plastic and transparent glass.

4. The imaging system with safety control of claim 1, wherein said multi-walled tapered body comprises a solid transparent structure having four walls in which a first wall opposite a second wall are equally sized and a third wall adjacent said first and second walls and opposite a fourth wall are equally sized, wherein said first and second walls are different in size relative to said third and fourth walls.

5. The imaging system with safety control of claim 1, wherein said multi-walled tapered body comprises a solid transparent structure having more than four walls equally sized.

6. The imaging system with safety control of the claim 1, wherein said multi-walled tapered body comprises a hollow structure with the walls being mirror surfaces.

7. The imaging system with safety control of claim 1, wherein the input face of the light pipe, is juxtaposed with an output face of the illumination source such that all the light energy from the illumination source is collected by the light pipe.

8. The imaging system with safety control of claim 1, further comprising a Printed Circuit (PC) board, wherein an optical axis of the projection lens and the light pipe is perpendicular to the PC board.

9. The imaging system with safety control for imaging target objects comprising:

a scanning arrangement comprising a sensor assembly for capturing an image from a target object, the sensor assembly having a field-of-view focused by an optical arrangement onto a sensor array located within the sensor assembly; and an illumination assembly comprising a housing, illumination source, light pipe, and projection lens, the illumination assembly providing light energy toward the sensor assembly field-of-view for illuminating the target object to be imaged on the sensor array;

the light pipe comprising a multi-walled tapered body having an input face at a first end of said body, the input face being juxtaposed with the illumination source and an output face at a second end of said body opposite said first end, the input face being smaller in size than said output face, the walls of said body creating mirrored images of the illumination source that redistribute the amount of light energy directed at any particular area of the human eyes, wherein said light pipe further comprises a field lens adapted to said output face on the second end of said body, said field lens further facilitating the redistributing in the amount of light energy directed at the eyes of the user.

10. The imaging system with safety control of claim 9, wherein said light pipe further comprises first and second tabs molded into and extending therefrom for securing said light pipe between corresponding catches and a stop formed in said housing.

11. The imaging system with safety control of claim 9, wherein said light pipe and projection lens provide substantially uniform light energy over a concentrated area in or over the field-of-view of said sensor array while collective redistributing the amount of said uniform light energy directed at a lens simulating the human eye such that the uniform light energy projected through the simulated eye lens is diffused into a plurality of locations below an accessible energy level.

12. The imaging system with safety control of claim 11, wherein said field lens and projection lens are convex lenses.

13. The imaging system with safety control of claim 9, wherein said light pipe and projection lens provide substantially uniform light energy over a concentrated area in or over the field-of-view of said sensor array while collective reducing the amount of said uniform light energy directed at a lens simulating the human eye such that the light energy projected through the simulated eye lens is diffused into an area greater than said concentrated area below an accessible energy level.

14. A method of imaging a target object with an imaging system having safety control comprising:

providing a substantially uniform distribution of light energy in a concentrated area in or over a field-of-view of a sensor array of a scanning arrangement by juxtaposing an input face of a tapered-shaped light pipe having a field lens with an illumination source and projecting said light energy through a projection lens; and generating mirrored images of said illumination source with side walls forming said light pipe thereby redistributing the amount of said light energy directed at a lens simulating the human eye such that light energy projected through the simulated eye lens is diffused into a plurality of sectors below an accessible energy level.

15. The method of imaging a target object with an imaging system having safety control of claim 14 wherein the input face of the tapered-shaped light pipe is juxtaposed with the illumination source such that all the light energy from the illumination source is collected by the tapered-shaped light pipe.

16. The method of imaging a target object with an imaging system having safety control of claim 14 further comprising coupling an optical axis of the projection lens and the tapered-shaped light pipe to a Printed Circuit (PC) board.

17. The method of imaging a target object with an imaging system having safety control comprising:

providing a substantially uniform distribution of light energy in a concentrated area in or over a field-of-view of a sensor array of a scanning arrangement by adapting an input face of a tapered-shaped light pipe having a field lens to an illumination source and projecting said light energy through a projection lens;

generating mirrored images of said illumination source with side walls forming said light pipe thereby redistributing the amount of said uniform light energy directed at a lens simulating the human eye such that the light energy projected through the simulated eye lens is diffused into a plurality of sectors and an area greater than said concentrated area below an accessible energy level.

18. The method of imaging a target object with an imaging system having safety control of claim 17 wherein said redistributing the amount of said uniform light energy directed at a lens simulating the human eye such that the light energy projected through the simulated eye lens is diffused into an area greater than said concentrated area below an accessible energy level is achieved by providing said taper-shaped light pipe and field lens, and a projection lens collectively assembled in an illumination assembly subtended about said illumination source.

19. The method of imaging a target object with an imaging system having safety control of claim 18 further comprising providing a housing for said illumination assembly and securing said light pipe and field lens within said housing by first and second tabs extending from said light pipe for fixedly positioning the field lens and light pipe between said illumination source and projection lens.

20. A method of imaging a target object with an imaging system having safety control comprising:
   providing a substantially uniform distribution of light energy in a concentrated area in or over a field-of-view of a sensing means coupled to a scanning arrangement by juxtaposing a light transferring means with an illumination means and projecting said light energy through optical means;
   generating mirrored images of said illumination means with side walls forming said light transferring means thereby reducing the amount of said light energy directed at a lens simulating the human eye such that light energy projected through the lens is diffused into a plurality of sectors; and
   redistributing the amount of said uniform light energy directed at the lens simulating the human eye such that the light energy projected through the lens is diffused into an area greater than said concentrated area.

21. A scanning arrangement with safety control for imaging and decoding target objects comprising:
   a sensor assembly for capturing an image from a target object, the sensor assembly having a field-of-view focused by an optical arrangement onto a sensor array located within the sensor assembly;
   an illumination assembly comprising a housing, illumination source, light pipe, and projection lens, the illumination assembly providing light energy toward the sensor assembly field-of-view for illuminating the target object to be imaged on the sensor array;
   the light pipe comprising a multi-walled tapered body between a first end and a second end opposite the first end, the first end having a input face juxtaposed with the illumination source and an output face having the same geometrical configuration as said input face, the input face being smaller in size than said output face, and
   a field lens integrally connected on the second end of the output face of said light pipe, the walls of said tapered body creating mirrored images of the illumination source and the field lens and projection lens to magnify and project the images of the illumination source, such that collectively, said projection lens, field lens and light pipe reduce and redistribute the amount of light energy directed at the eyes of the user.

22. The scanning arrangement with safety control of claim 21, wherein said field lens and light pipe are integrally formed from one of transparent plastic and transparent glass.

23. The scanning arrangement with safety control of claim 21, wherein said scanning arrangement adapted to one of a portable and stationary scanner for imaging barcodes.

24. The scanning arrangement with safety control of claim 21, wherein said multi-walled tapered body of said light pipe comprises unequally sized walls.

* * * * *